(12) United States Patent
Huang et al.

(10) Patent No.: US 9,916,230 B1
(45) Date of Patent: Mar. 13, 2018

(54) WHITE BOX TESTING (71) Applicant: International Business Machines Corporation, Armonk, NY (US)

(72) Inventors: Da L. Huang, Beijing (CN); Zhang Wu, Shanghai (CN); Lu Yu, Beijing (CN); Xin Zhang, Shanghai (CN); Yun Jie Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/677,189

(22) Filed: Aug. 15, 2017

Related U.S. Application Data (63) Continuation of application No. 15/275,739, filed on Sep. 26, 2016.

(51) Int. Cl.
*G06F 9/45* (2006.01)
*G06F 11/36* (2006.01)

(52) U.S. Cl.
CPC ...... *G06F 11/3684* (2013.01); *G06F 11/3676* (2013.01); *G06F 11/3688* (2013.01)

(58) Field of Classification Search
CPC ............. G06F 11/3466; G06F 11/3636; G06F 11/3409
USPC ........................................................ 717/133
See application file for complete search history.

(56) References Cited

U.S. PATENT DOCUMENTS

| | | | |
|---|---|---|---|
| 6,978,401 B2 | 12/2005 | Avvari et al. | |
| 7,165,074 B2 | 1/2007 | Avvari et al. | |
| 7,316,004 B2 | 1/2008 | Sluiman et al. | |
| 7,392,507 B2* | 6/2008 | Kolawa ............... | G06F 11/3624 714/E11.209 |
| 7,926,041 B2 | 4/2011 | Dimpsey et al. | |
| 8,381,184 B2 | 2/2013 | Johnson et al. | |
| 8,819,642 B2 | 8/2014 | Bhat et al. | |
| 9,135,149 B2 | 9/2015 | Perin et al. | |
| 2004/0025088 A1 | 2/2004 | Awari et al. | |
| 2005/0144593 A1* | 6/2005 | Raghuvir ............ | G06F 11/3688 717/124 |
| 2007/0033440 A1* | 2/2007 | Tillmann ............ | G06F 11/3684 714/38.14 |

(Continued)

FOREIGN PATENT DOCUMENTS

CN 102736979 B 12/2014

OTHER PUBLICATIONS

Ramadoss et al., "Combined Classification Tree Method for Test Suite Reduction", 2nd International Conference and workshop on Emerging Trends in Technology (ICWET), 2011, Proceedings published by international Journal of Computer Applications® (IJCA), 7 pages.

(Continued)

*Primary Examiner* — John Chavis
(74) *Attorney, Agent, or Firm* — Laura E. Gisler (57) ABSTRACT

The source code of a software artifact may be scanned, and a call tree model with leaf nodes may be generated based on the scan. A set of test cases can be executed against the software artifact and log data from the execution can be collected. A set of untested leaf nodes can be detected and a new set of test cases can be generated to test the untested nodes. The new set of test cases are executed and a subset of the test cases which cover the previously untested nodes are added to the existing set of test cases.

1 Claim, 8 Drawing Sheets

(56) References Cited

U.S. PATENT DOCUMENTS

| | | | |
|---|---|---|---|
| 2009/0144698 A1* | 6/2009 | Fanning | G06F 8/75 717/120 |
| 2009/0178021 A1 | 7/2009 | Alluri | |
| 2014/0101640 A1* | 4/2014 | Romdhane | G06F 11/3684 717/125 |
| 2014/0304688 A1 | 10/2014 | Bhat et al. | |
| 2015/0261657 A1* | 9/2015 | Kommineni | G06F 11/3676 714/38.1 |
| 2017/0132119 A1 | 5/2017 | Xu et al. | |
| 2017/0212829 A1* | 7/2017 | Bales | G06F 11/3664 |
| 2017/0293763 A1* | 10/2017 | Shear | G06F 21/57 |

OTHER PUBLICATIONS

Smith et al., "Test Suite Reduction and Prioritization with Call Trees", Proceedings of the twenty-second IEEE/ACM international conference on Automated software engineering, ASE'07, Nov. 2007, ACM, 2 pages.

Huang et al., "White Box Testing", U.S. Appl. No. 15/275,739, filed Sep. 26, 2016.

List of IBM Patents or Patent Applications Treated as Related, dated Aug. 16, 2017, pp. 1-2.

\* cited by examiner

WHITE BOX TESTING

BACKGROUND

The present disclosure relates to white box testing, and more specifically, to test case generation in white box testing.

White box testing is a method of software testing that may test the internal structure and workings of an application. As opposed to black box testing, which may test the functionality of software, white box testing provides for an internal perspective of the system. In white box testing, this internal perspective may be used by a tester to design test cases to run and test various paths within the execution of the software code. The output of these test cases may be compared with the designed or intended outputs.

White box testing may be applied at the unit level. However, it may also be used at integration level, for example, by testing pathways between units during integration. White box testing may also be used at the system level, to test paths between subsystems during system-level testing.

SUMMARY

Embodiments of the present disclosure may be directed toward a method that begins when the source code of a software artifact is scanned. A call tree model may be generated based on the scan. The call tree model may have a set of leaf nodes, where each leaf node represents a source code statement. A set of existing test cases may be executed against the software artifact, and log data, generated from the executing, may be collected. A set of untested leaf nodes in the log data may be detected, and a set of new test cases may be generated for the set of untested leaf nodes. Each new test case may be generated to test untested leaf nodes in the set. The set of new test cases may be executed against the software artifact, and a subset of the new test cases, where the subset contains cases that successfully tested one or more of the untested leaf nodes, may be determined. The subset of new test cases may then be added to the set of existing test cases.

Embodiments of the present disclosure may be directed toward a system with a computer readable storage medium with program instructions stored thereon and a processor configured to execute the program instructions to perform a method. The method may begin when the source code of a software artifact is scanned. A call tree model may be generated based on the scan. The call tree model may have a set of leaf nodes, where each leaf node represents a source code statement. A set of existing test cases may be executed against the software artifact, and log data, generated from the executing, may be collected. A set of untested leaf nodes in the log data may be detected, and a set of new test cases may be generated for the set of untested leaf nodes. Each new test case may be generated to test untested leaf nodes in the set. The set of new test cases may be executed against the software artifact, and a subset of the new test cases, where the subset contains cases that successfully tested one or more of the untested leaf nodes, may be determined. The subset of new test cases may then be added to the set of existing test cases.

Embodiments of the present disclosure may be directed toward a computer program product with a computer readable storage medium with program instructions. The computer readable storage medium is not a transitory signal per se. The program instructions may be executable by a computer processing circuit to cause the circuit to perform a method. The method may begin when the source code of a software artifact is scanned. A call tree model may be generated based on the scan. The call tree model may have a set of leaf nodes, where each leaf node represents a source code statement. A set of existing test cases may be executed against the software artifact, and log data, generated from the executing, may be collected. A set of untested leaf nodes in the log data may be detected, and a set of new test cases may be generated for the set of untested leaf nodes. Each new test case may be generated to test untested leaf nodes in the set. The set of new test cases may be executed against the software artifact, and a subset of the new test cases, where the subset contains cases that successfully tested one or more of the untested leaf nodes, may be determined. The subset of new test cases may then be added to the set of existing test cases.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to white box testing; more particular aspects relate to test case generation in white box testing. While the present disclosure is not necessarily limited to such applications, various aspects of the disclosure may be appreciated through a discussion of various examples using this context.

White box testing may be used in software development to test code for a particular application. Before an application (or a component of an application) is released for use, all of the application's code statements may be tested. Open source development and increased collaborations among developers have led to very large codes as well as a large number of source code files. The increased size of the files, as well as the increase in collaborations, may result in a developer using code which is unfamiliar. Identifying and creating test cases for applications in this context may be difficult.

White box testing may involve tracing possible execution paths through the code and working out which input values would force the execution of these paths. The source code of a software application may be tested by scanning the source code of the software artifact. Based on the scanning, a system may generate a call tree model. This call tree model may serve as a visualization of the coverage of the logical branches of the source code, and the call tree model may have different nodes that reflect the different paths and sequence of the execution of the source code.

The software artifact may have a set of existing test cases for which the output is known. After the call tree model is generated, the system may then execute the set of existing test cases against the software artifact. Output (e.g., log data) may be generated from the test case execution, and this data may be collected by the system. Using this data, the system may detect a set of untested leaf nodes on the call tree. These untested leaf nodes indicate paths or sequences in the source code that are not currently covered by the set of test cases (e.g., gaps in the test cases). A set of additional test cases can then be generated for the untested (e.g., unattempted) nodes in the call tree. These additional test cases can then be run against the software artifact and the additional test cases which did, in fact, test the previously untested nodes can be determined and added to the set of existing test cases. Thus, the set of test cases can be updated to fill in gaps in the test case coverage and to more comprehensively cover the code.

Figure 1:
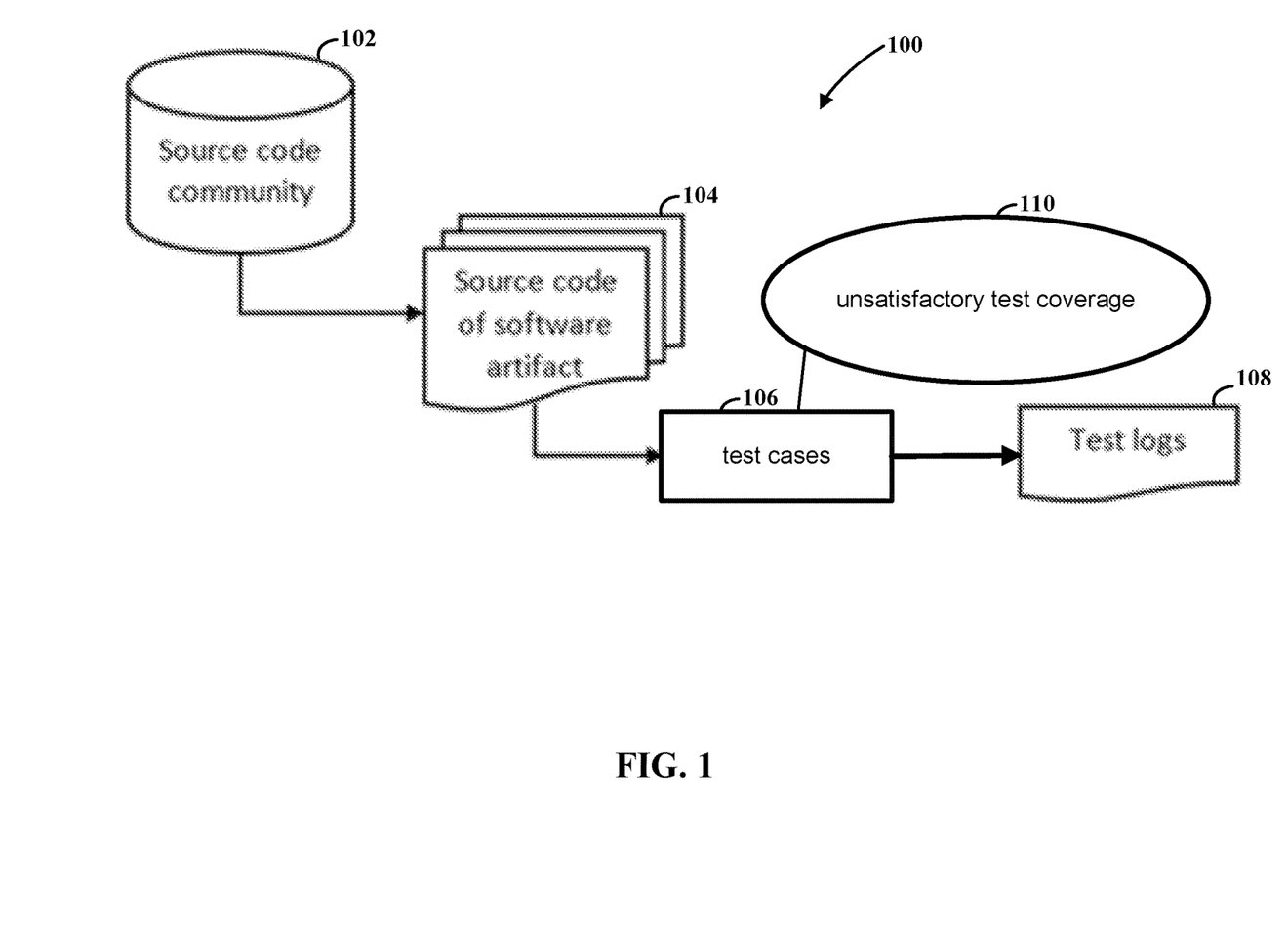
FIG. 1 depicts an overview of a white box testing flow, highlighting the gap in test cases, according to embodiments.

FIG. 1 depicts an overview of a white box testing flow 100, highlighting the gap in test cases, according to embodiments. The testing flow 100 depicts source code community 102 as a database. This may represent a set of data storage locations at which source code may be stored. For example, this may be source code exchanged in an open source community. It could also be source code purchased or accessed from a third-party developer over the Internet, or any location that source code may be stored in the broader source code community.

The source code community may generate or identify source code from software artifacts 104. Each source code artifact may be received with a set of test cases 106. These test cases 106 may have been developed along with the original source code in the software artifact 104. However, as noted at comment 110, the test cases 106 which were supplied with the software artifacts 104 may provide unsatisfactory test coverage, per comment 110. Test coverage may be unsatisfactory due to gaps in the test coverage, in which each pathway in the execution of the source code of the software artifact 104 is not covered (i.e., tested). The test cases 106 may generate one or more test logs 108 (i.e., output), when they are run against the source code of the particular software artifact. These test logs 108 can be compared with the predicted output of the test cases to determine correctness of the source code.

Figure 2:
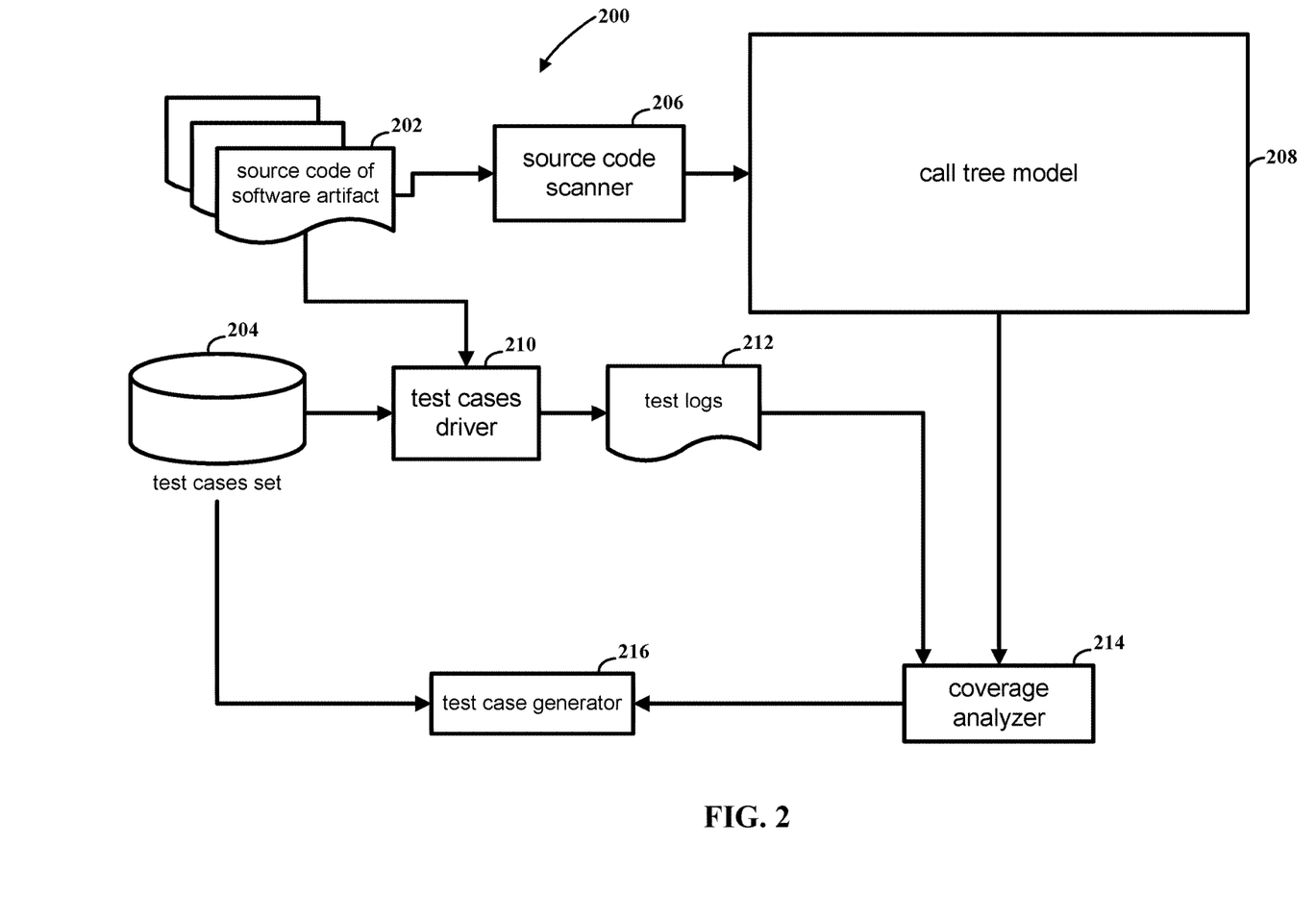
FIG. 2 depicts a block diagram of an overview of a system flow for generating test cases, using a call tree model, according to embodiments.

FIG. 2 depicts a block diagram of an overview of a system flow 200 for generating test cases, using a call tree model, according to embodiments. The source code from a particular software artifact 202 may be accessed by a source code scanner 206. The source code scanner may scan the source code files 202 in order to generate a call tree model 208. A call tree model like the call tree model 208 is discussed in detail at FIG. 3. The call tree model 208 can depict each of the logical paths of the source code artifact.

In embodiments, the test cases driver 210 is built out from the source code of the software artifact 202. The test cases driver 210 may access and run a set of test cases 204. The set of test cases 204 may have been developed alongside the source code 202. The test cases set 204 may also be a set of cases developed prior to the source code (e.g., by the source code developers), after the source code was written (e.g., by the original source code developers, by an automated process, or by a third-party following, for example, modifications to the source code), or in a combination of the above. The test cases set 204 can be run by the test cases driver 210 to create (i.e., output) the test logs 212. Test logs, in a white box testing environment, may include a set of log entries that contain information on each of the executed paths.

In embodiments, the coverage analyzer 214 may then access both the test logs 212 and the call tree model 208. The coverage analyzer 214 may analyze the various nodes of the call tree model 208 to determine which nodes have been attempted, which have been unattempted, and which nodes were partially (but not fully) attempted. The coverage analyzer 214 may then color code the nodes of the call tree model 208 according to the determination. For example, a node on the call tree model 208 that was fully attempted may be colored black. A node which was unattempted may be colored white, and a node which was only partially attempted may be colored grey by the coverage analyzer 214. For nodes in the call tree model 208 that were unattempted, the coverage analyzer 214 may analyze the nodes, and locate nodes which were uncovered by the previous testing. The coverage analyzer 214 may link the located uncovered nodes together to generate a list or blocks of uncovered code. The coverage analyzer may also determine which test cases provide good coverage of adjacent neighbor nodes.

The test case generator 216 may use the uncovered code data from the coverage analyzer 214, to provide a list of uncovered code blocks to a user (e.g., a software tester). The test case generator 216 may provide this data to a user to help guide the tester to design new test cases to file the gaps in testing. The test case generator 216 may also generate test cases without user intervention, based on the data received from the coverage analyzer 214. For example, for an "if" block, where one of the "if" statements and one of the "else" statements is covered, the test case generate 216 may analyze the code and adjust the input parameter to cover the other statement. This can be done using a case or set of cases which covers the "if" or "else" statement at issue, as a model. A new test case for a "select" block may be generated by the test case generator 216 in a similar manner as for the "if" block. The new test cases may then be run, and those cases which are determined to, in fact, cover previously untested (i.e., uncovered) blocks may be added to the test cases set 204.

Figure 3:
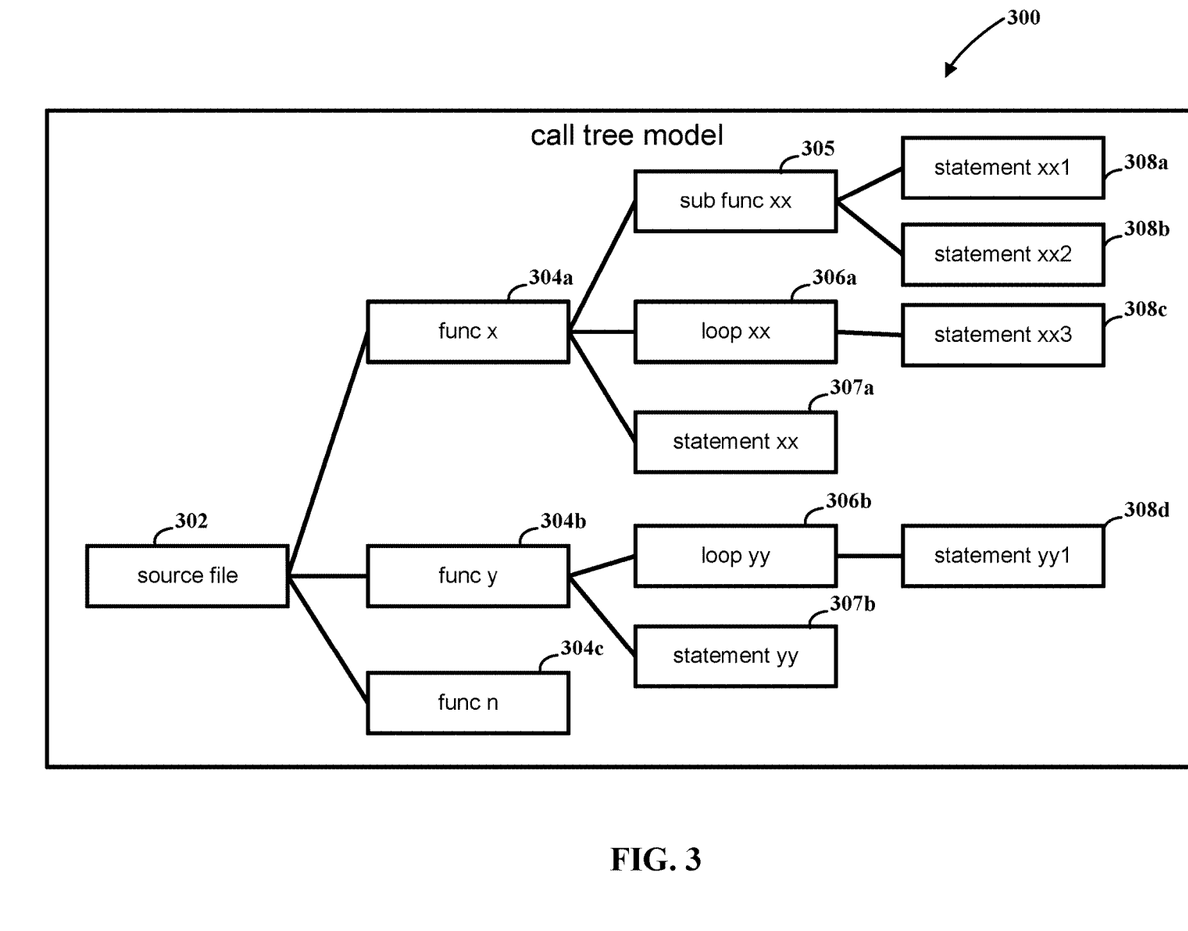
FIG. 3 depicts a block diagram of a call tree model for mapping execution paths of a software artifact, according to embodiments.

FIG. 3 depicts a block diagram of a call tree model 300 for mapping execution paths of a software artifact, according to embodiments. As depicted herein, the source code may be contained within a source file 302. The call tree model may depict a number of functions (for example, 304 func x, y, and z, and sub func xx 305), loops (for example, loop xx and loop yy 306), and statements (for example, statements xx and yy 307, and statements xx1, xx2, xx3, and yy1 308). In the call tree model 300, statements may be represented as leaf nodes, while loop or function calls may be represented as non-leaf nodes. In embodiments, a set of intermediate nodes may be included in the call tree model 300, and may represent non-leaf nodes that are branch, loop, or function call nodes.

In embodiments, the generation of the call tree model may also include the generation of various data related to each of the nodes in the call tree model, as well as other execution data about the source code. For example, each node representation in the call tree model may include the following: a node name, a node type, a conditional or parameter or set of parameters, line range, parent ptr, child list, an indication of whether or not the node has been tested (i.e., "isTested"), and a cases list. The node type could be, for example, a file, a function, a branch, a selected, or a loop. The line range may include a node range start line number and a node range end line number. The parent ptr may be data that points to the particular node's parent node. The child list may include data that contains all the child nodes for the particular node. In some instances, the order of the child nodes in the list may indicate the order the child nodes exist in the code block.

Figure 4:
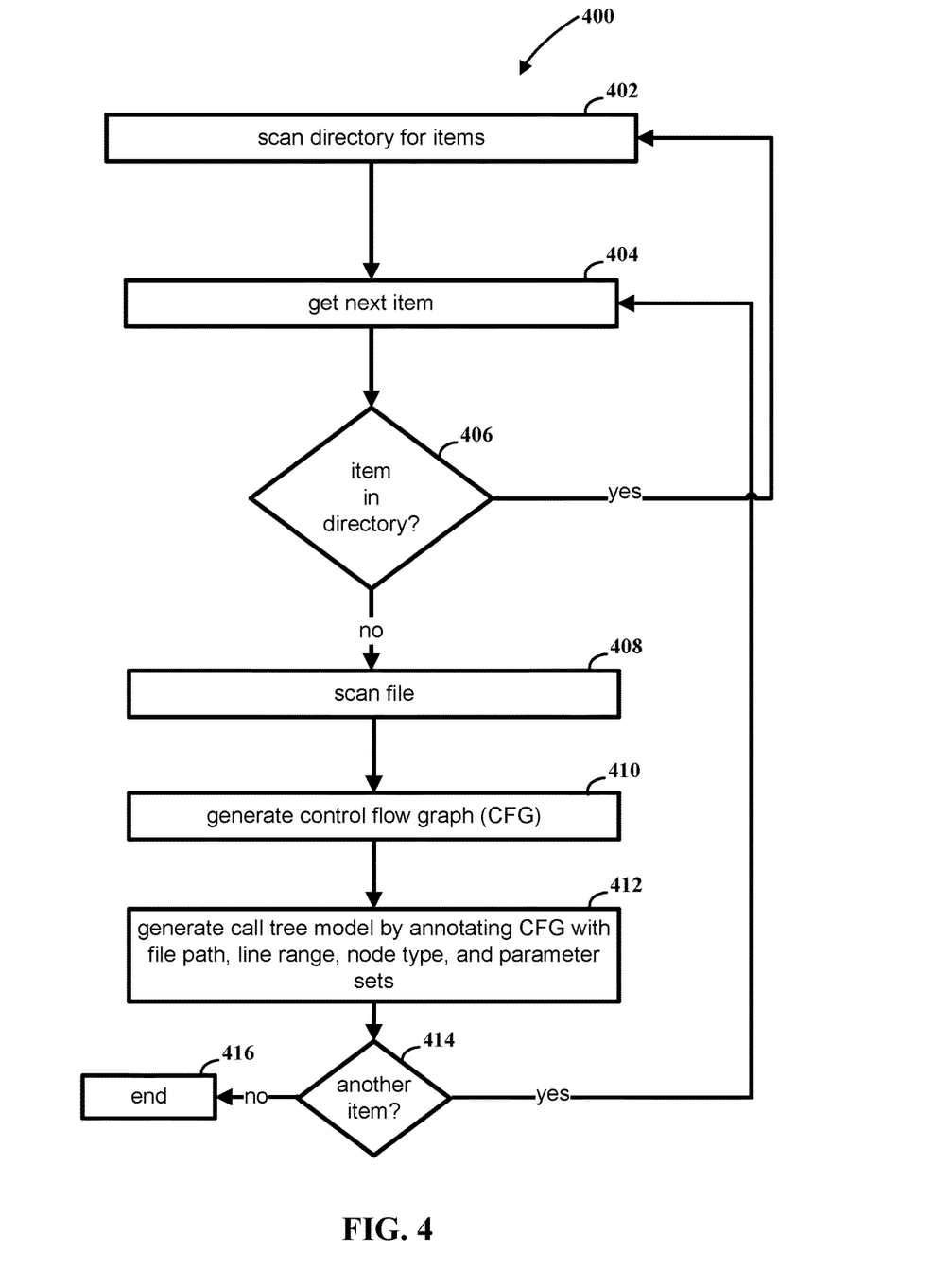
FIG. 4 depicts a flow chart of a method for the generation of the call tree model from a root directory, according to embodiments.

FIG. 4 depicts a flow chart of a method 400 for the generation of the call tree model from a root directory, according to embodiments. The call tree model may be generated starting from a root directory (i.e., a root node). The source code scanner, for example, the source code scanner 206 in FIG. 2, may begin to do a directory scan for an item in the root directory, per 402. For example, the item could be a directory, sub-directory, or files under the sub-directory. The source code scanner could locate and get the (next) item, per 404. If the item is in the directory, meaning for example, it has been scanned previously, at 406, the source code scanner can return to scanning, per 402. If the item is not in the directory, at 406, the source code scanner can scan the file, per 408. Using the data from the file scan, the source code scanner can generate a control flow graph (CFG) for the file, per 410, where the CFG can depict all the paths that could be traversed during the execution of the file. At 412, the call tree model can then be generated by the annotation of the CFG. The annotations can include things like file path, line range, node type, and sets of parameters specifying particular nodes. If another item, at 414, is available in the directory, the source code scanner can return to 404, to get the next item and continue through the flow. If all items in the directory have been accounted for, at 414, the source code scanner can end, per 416.

Figure 5:
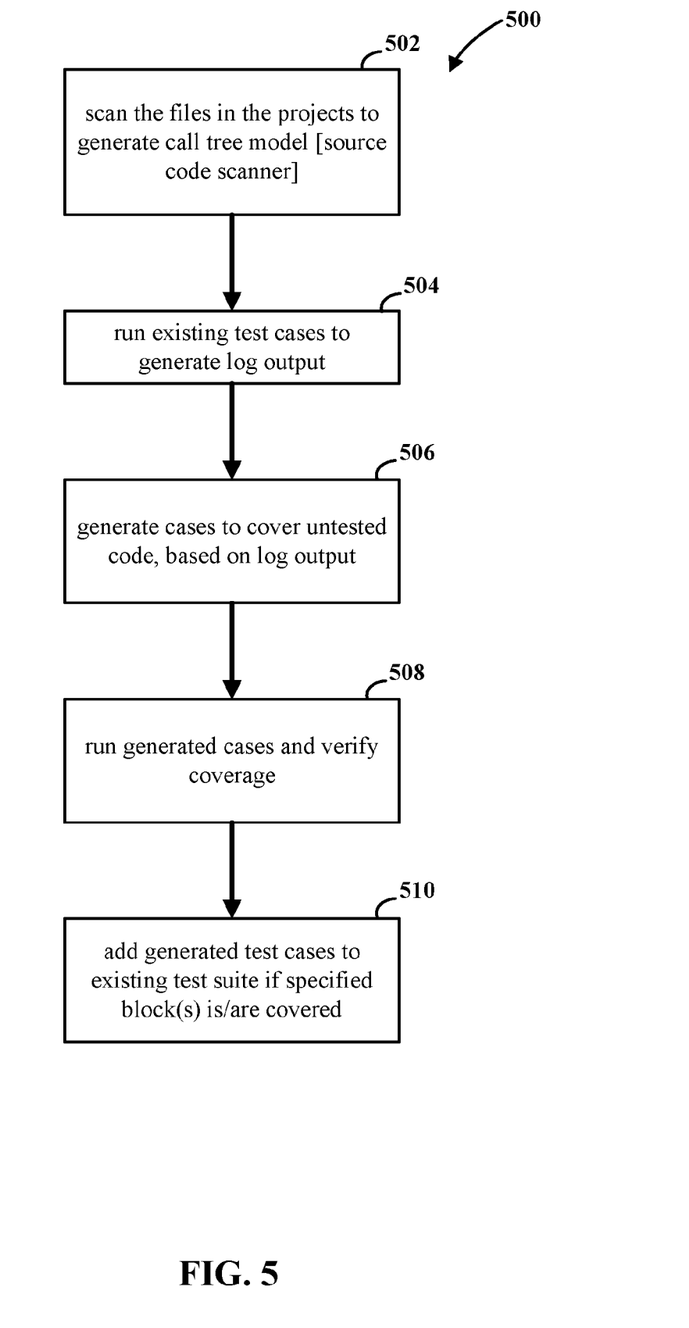
FIG. 5 depicts a flow chart of a method for generating test cases based on a call tree model, consistent with embodiments.

FIG. 5 depicts a flow chart of a method 500 for generating test cases based on a call tree model, consistent with embodiments. At 502, the method may begin when the system scans the files in the projects to generate a call tree model. For example, the call tree model can be generated as described in method 400 of FIG. 4. As described herein, the call tree model may be generated by a source code scanner, for example the source code scanner 206 of FIG. 2. The system may then run existing test cases to generate output, for example log output, per 504. In embodiments, the test cases can be from a test case set, for example, test cases set 204 of FIG. 2. The test case driver 210 may execute the test cases to generate the test logs 212, both of FIG. 2. The system may then generate cases to cover the untested code, based on, for example, the log output, per 506. The system may then run the generated cases and verify the coverage, per 508. Based on the output generated from running the newly generated cases, the system may add the generated test cases to the existing test suite if the specified (e.g., the previously uncovered test cases), are covered, per 510. For example, the newly generated test cases that cover the specified cases may be added to the test case set 204 of FIG. 2.

Figure 6:
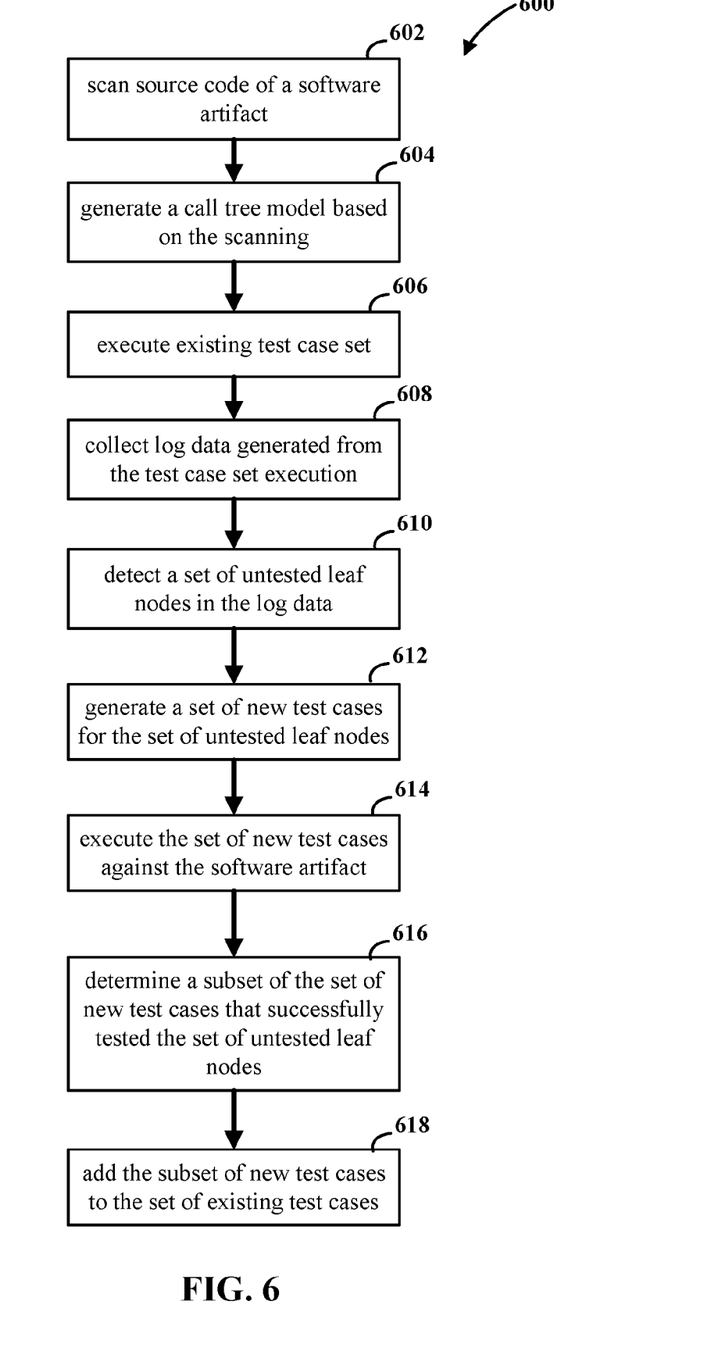
FIG. 6 depicts a flow chart of a method for generating a set of new test cases to cover gaps in the white box testing of a software artifact, according to embodiments.

FIG. 6 depicts a flow diagram of a method 600 for generating a set of new test cases to cover gaps in the white box testing of a software artifact, according to embodiments. The system may scan the source code of a software artifact, per 602. The system may then generate a call tree model based on the scanning, per 604. The model may be generated according to, for example, the method 400 described in FIG. 4. The system may then execute the existing test case set, as described herein, per 606, and collect the log data which is generated from the test case set execution, per 608. The system may detect a set of untested leaf nodes in the log data, per 610. For example, these untested nodes could be detected by a coverage analyzer 214, as in FIG. 2. The system may generate a set of new test cases for the set of untested leaf nodes, per 612. The new test cases may be generated as described in, for example, method 700 of FIG. 7, or in another way. The system may then execute the set of new test cases against the software artifact, per 614. Based on the log output of the execution, the system may determine a subset of the newly generated test cases that successfully tests the set of previously untested leaf nodes, per 616. In embodiments, this determining may be done by a test case generator, for example, test case generator 216 of FIG. 2. The system can then add the subset of new test cases to the set of the existing test cases, per 618.

Figure 7:
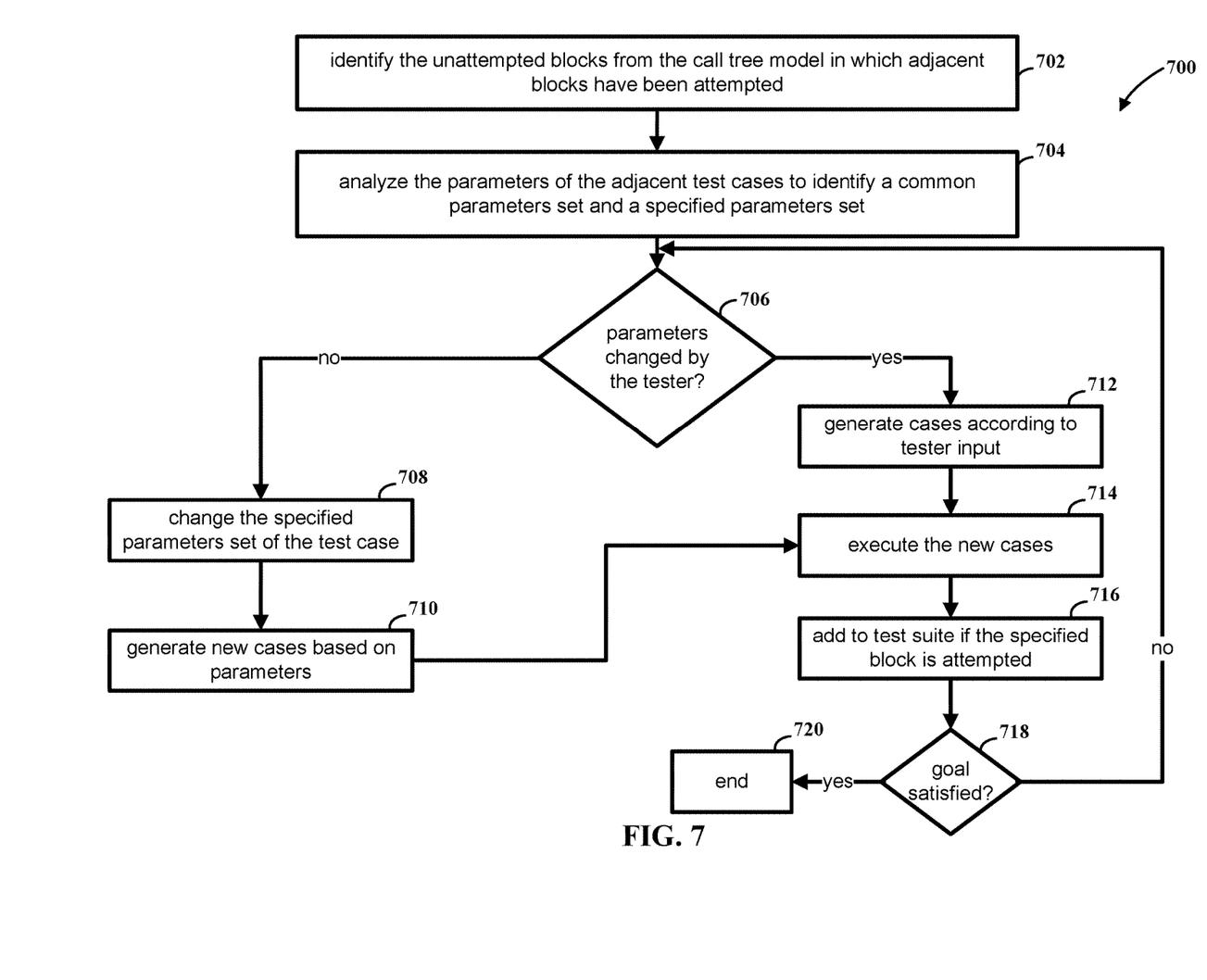
FIG. 7 depicts a flow chart of a method for generating a set of test cases, based on unattempted blocks or nodes on a call tree model, according to embodiments.

FIG. 7 depicts a flow chart of a method 700 for generating a set of test cases, based on unattempted blocks or nodes on a call tree model, according to embodiments. The method 700 may begin when the system, for example, the coverage analyzer 214 of FIG. 2, identifies the unattempted blocks from the call tree model, per 702. In embodiments, the coverage analyzer may detect which blocks in the call tree model have not been attempted, but are adjacent to blocks that have been attempted. The system may then analyze the parameters of the adjacent test cases to identify a common parameter set and a set of specified parameters, per 704. The system may then determine whether or not the parameters have been changed (e.g., manually) by the tester, for example, in response to the generated call tree model indicating gaps in the testing coverage, per 706.

According to embodiments, if the parameters are not adjusted by the tester, based on the identified gaps in the test set, the system may change a set of specified parameters for the test case, per 708. Based on the new parameters, the system may generate a set of new test cases, the new test cases being intended to cover the previously uncovered blocks (i.e., nodes) on the call tree model. The system may execute the new cases, per 714, and add the newly generated test cases to the test suite (i.e., set of test cases), if the specified, previously unattempted blocks are attempted, per 716.

If, at 706, the system detects that the parameters have been changed by the tester, the system may generate cases, according to the test input (e.g., responsive to the new manually input parameters), per 712. The system may then execute the new cases against the original source code, per 714, and add a subset of the new test cases to the test suite (i.e., set of test cases), if the new test cases covered the unattempted (i.e., specified) cases, per 716.

In embodiments, once the new test cases have been added, as appropriate, per 716, the system may determine if the goal has been satisfied, per 718. For example, the goal may be a coverage goal of how many nodes or a percentage of nodes on a call tree model are covered by test cases, or another goal. If at 718, the system determines that the goal has been satisfied, the flow may end, per 720. If, at 718, the system determines the goal has not been satisfied, the system may return to 706, to detect tester-initiated changes in the specified parameters, and continue through the flow of test case generation, until the coverage goal has been satisfied.

Figure 8:
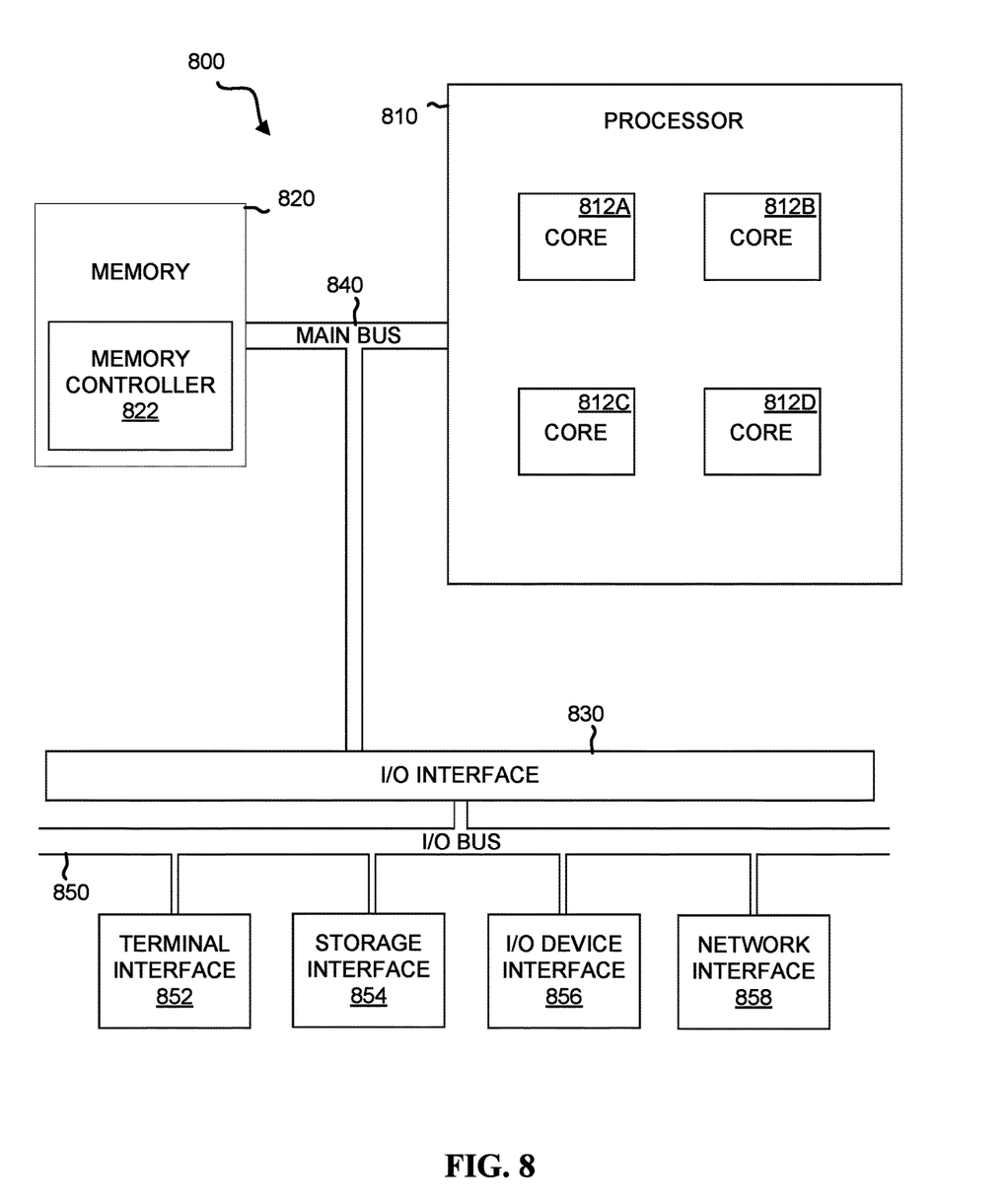
FIG. 8 depicts a block diagram of an example computer system, according to embodiments.

FIG. 8 depicts the representative major components of an example computer system 800 that may be used, in accordance with embodiments of the present disclosure. It is appreciated that individual components may vary in complexity, number, type, and\or configuration. The particular examples disclosed are for example purposes only and are not necessarily the only such variations. The computer system 800 may comprise a processor 810, memory 820, an input/output interface (herein I/O or I/O interface) 830, and a main bus 840. The main bus 840 may provide communication pathways for the other components of the computer system 800. In some embodiments, the main bus 840 may connect to other components such as a specialized digital signal processor (not depicted).

The processor 810 of the computer system 800 may be comprised of one or more cores 812A, 812B, 812C, 812D (collectively 812). The processor 810 may additionally include one or more memory buffers or caches (not depicted) that provide temporary storage of instructions and data for the cores 812. The cores 812 may perform instructions on input provided from the caches or from the memory 820 and output the result to caches or the memory. The cores 812 may be comprised of one or more circuits configured to perform one or methods consistent with embodiments of the present disclosure. In some embodiments, the computer system 800 may contain multiple processors 810. In some embodiments, the computer system 800 may be a single processor 810 with a singular core 812.

The memory 820 of the computer system 801 may include a memory controller 822. In some embodiments, the memory 820 may comprise a random-access semiconductor memory, storage device, or storage medium (either volatile or non-volatile) for storing data and programs. In some embodiments, the memory may be in the form of modules (e.g., dual in-line memory modules). The memory controller 822 may communicate with the processor 810, facilitating storage and retrieval of information in the memory 820. The memory controller 822 may communicate with the I/O interface 830, facilitating storage and retrieval of input or output in the memory 820.

The I/O interface 830 may comprise an I/O bus 850, a terminal interface 852, a storage interface 854, an I/O device interface 856, and a network interface 858. The I/O interface 830 may connect the main bus 840 to the I/O bus 850. The I/O interface 830 may direct instructions and data from the processor 810 and memory 820 to the various interfaces of the I/O bus 850. The I/O interface 830 may also direct instructions and data from the various interfaces of the I/O bus 850 to the processor 810 and memory 820. The various interfaces may include the terminal interface 852, the storage interface 854, the I/O device interface 856, and the network interface 858. In some embodiments, the various interfaces may include a subset of the aforementioned interfaces (e.g., an embedded computer system in an industrial application may not include the terminal interface 852 and the storage interface 854).

Logic modules throughout the computer system 800—including but not limited to the memory 820, the processor 810, and the I/O interface 830—may communicate failures and changes to one or more components to a hypervisor or operating system (not depicted). The hypervisor or the operating system may allocate the various resources available in the computer system 800 and track the location of data in memory 820 and of processes assigned to various cores 812. In embodiments that combine or rearrange elements, aspects and capabilities of the logic modules may be combined or redistributed. These variations would be apparent to one skilled in the art.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
    scanning source code of a software artifact, the scanning starting at a root directory;
    generating, based on the scanning, a call tree model, the call tree model comprising a set of leaf nodes, wherein each leaf node represents a source code statement, and a set of intermediate nodes, wherein the set of intermediate nodes represent one of a group consisting of a branch, a loop, and a function call;
    generating, in response to the scanning, a set of execution data about the source code, the set of execution data comprising a node name, a node type, a conditional, a line range, a child list, and an indication of the testing status of the node;
    executing, against the software artifact, a set of existing test cases;
    collecting, responsive to the executing, log data, wherein the log data is generated from the executing of the set of existing test cases;
    detecting, in the log data, a set of untested leaf nodes;
    receiving, in response to the detecting a set of untested leaf nodes and from a user, a set of parameters specifying a subset within the set of untested leaf nodes, wherein the subset of the new test cases comprise new test cases which successfully tested one or more of the untested leaf nodes in the subset of untested leaf nodes specified by the parameters;
    generating, for the set of untested leaf nodes, a set of new test cases, wherein each new test case in the set of new test cases is generated to test untested leaf nodes in the set of untested leaf nodes;
    executing, against the software artifact, the set of new test cases;
    determining, from the set of new test cases and based on the executing the set of new test cases, a subset of the new test cases, wherein the subset comprises new test cases which successfully tested one or more untested leaf nodes in the set of untested leaf nodes, and wherein the determining comprises:
        identifying a set of particular test cases from the set of new test cases that cover adjacent neighbor nodes; and
        adding, to the subset of new test cases, the set of particular test cases; and adding, to the set of existing test cases, the subset of the new test cases.

* * * * *